United States Patent Office 3,178,443
Patented Apr. 13, 1965

3,178,443
N-(2-GUANIDINOETHYL)-N-(PICOLYL)-AMINES
Robert Paul Mull, Florham Park, N.J., assignor to Ciba Corporation, New York, N.Y., a corporation of Delaware
No Drawing. Filed Apr. 1, 1963, Ser. No. 269,714
7 Claims. (Cl. 260—296)

The present invention concerns guanidine compounds. Particularly, it relates to compounds of the formula

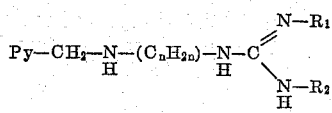

in which Py is a pyridyl radical, the group of the formula —($C_nH_{2n}$)— is lower alkylene separating the two nitrogen atoms by at least two carbon atoms, and each of the groups $R_1$ and $R_2$ is hydrogen or lower alkyl, or acid addition salts thereof, as well as process for the preparation of these compounds.

The group Py is primarily pyridyl, e.g. 2-pyridyl, 3-pyridyl or 4-pyridyl, but may also represent substituted pyridyl, such as (lower alkyl)-pyridyl, in which lower alkyl is methyl, ethyl, n-propyl, isopropyl, n-butyl and the like.

The group of the formula —($C_nH_{2n}$)— is lower alkylene separating the two nitrogen atoms attached to it by at least two, preferably by two to three, carbon atoms. It has preferably from two to seven, particularly from two to three, carbon atoms (i.e. the letter $n$ stands for an integer from 2 to 7, preferably from 2 to 3), and is represented by 1,2-ethylene, 1-methyl-1,2-ethylene, 2-methyl-1,2-ethylene or 1,3-propylene, as well as 1-methyl-1,3-propylene, 1,4-butylene, 1,4-dimethyl-1,4-butylene, 1-ethyl-1,4-butylene, 1,5-pentylene, 1,6-hexylene, 1,7-heptylene and the like.

The groups $R_1$ and $R_2$ stand primarily for hydrogen, but may also be lower alkyl, having preferably from one to four carbon atoms, particularly methyl, as well as ethyl, n-propyl, isopropyl, n-butyl, isbutyl, secondary butyl, tertiary butyl and the like.

Salts of the compounds of this invention are acid addition salts, primarily pharmaceutically acceptable, non-toxic acid addition salts with suitable acids, particularly inorganic acids, e.g. hydrochloric, hydrobromic, nitric, sulfuric, phosphoric acids and the like, or organic acids, such as organic carboxylic acids, e.g. acetic, malonic, succinic, maleic, hydroxymaleic, fumaric, malic, tartaric, citric, benzoic, 2-acetoxybenzoic, nicotinic, isonicotinic acid and the like, or organic sulfonic acids, e.g. methane sulfonic, ethane sulfonic, 2-hydroxyethane sulfonic, ethane 1,2-disulfonic, p-toluene sulfonic, naphthalene 2-sulfonic acid and the like. Acid addition salts may also serve as intermediates, for example, in the preparation of other acid addition salts, such as the pharmaceutically acceptable, non-toxic acid addition salts, or in the purification of the free compound, as well as being useful for characterization and identification purposes. Salts used for the latter are inter alia those with acidic organic nitro compounds, e.g. picric, picrolonic, flavianic acid and the like, or with metal complex acids, e.g. phosphotungstic, phosphomolybdic, chloroplatinic, Reinecke acid and the like. The compounds of this invention may form mono- or poly-acid addition salts.

The compounds of this invention have antihypertensive properties and can be used to lower the blood pressure in hypertensive conditions. The pharmacological action of the new compounds is of quick onset and prolonged duration. Unlike other compounds affecting the response to pressor amines, pharmacological experiments with the compounds of this invention show that they depress the pressor effects of amphetamine, epinephrine and norepinephrine; they can, therefore, also be used as research tools, particularly in the study of the pathways of the sympathetic nerve system and its reaction to pressor amines.

Particularly useful are the compounds of the formula

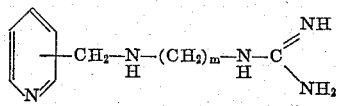

in which the letter $m$ stands for one of the integers 2 and 3, particularly the acid addition salts, such as the pharmaceutically acceptable non-toxic acid addition salts thereof.

The compounds of this invention may be used in the form of compositions suitable for enteral or parenteral use, which contain the new compounds or the salts thereof in admixture with an organic or inorganic, solid or liquid carrier. For making up these preparations there may be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier used in such compositions. The latter may be in the solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, coloring agents, flavoring agents etc. They may also contain, in combination, other useful substances.

The new guanidine compounds of this invention are prepared according to known methods, for example, by converting in an amine of the formula:

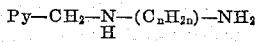

in which Py and the group of the formula —($C_nH_{2n}$)— have the previously-given meaning, or a salt thereof, the amino group into a guanidino group having the formula

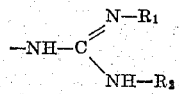

in which $R_1$ and $R_2$ have the previously-given meaning, and, if desired, converting a resulting salt into the free compound or into another salt, and/or, if desired, converting a free compound into a salt thereof.

The reagents of choice for the conversion of the amino group into a guanidino group are the S-lower alkyl-isothioureas or O-lower alkyl-isoureas having the formula

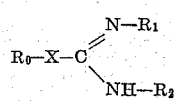

in which $R_1$ and $R_2$ have the previously-given meaning, $R_0$ stands for lower alkyl, particularly methyl, as well as ethyl, n-propyl, isopropyl and the like, and X is primarily sulfur, as well as oxygen, or acid addition salts thereof. The latter, which are employed in preference over the free bases, are especially those with mineral acids, such as hydrochloric, hydrobromic, or particularly sulfuric acid and the like. The preferred reagents are the mineral acid addition salts, e.g. the sulfates, of S-methyl-isothioureas. The starting materials are preferably used in the form of the free bases.

The reaction is carried out by contacting the starting material with the reagent, preferably in the presence of a diluent, the choice of which depends primarily on the solubility of the reactants. Water or water-miscible organic solvents, such as lower alkanols, e.g. methanol, ethanol, propanol, isopropanol, tertiary butanol and the like, ethers, e.g. diethyleneglycol dimethylether, p-dioxane, tetrahydrofuran and the like, ketones, e.g. acetone, ethyl methyl ketone and the like, lower alkanoic acids, e.g. acetic acid and the like, formamides, e.g. formamide, dimethylformamide and the like, or aqueous mixtures of such solvents are preferred diluents. The reaction is usually carried out at room temperature; however, it may be necessary to heat the reaction mixtures, for example, on the steam bath or to the boiling point of the solvent. An absence of oxygen may be achieved by performing it in the atmosphere of an inert gas, e.g. nitrogen.

Another reagent capable of transforming an amino group into the desired guanidino group, is a cyanamide compound of the formula

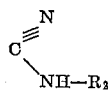

in which $R_2$ has the previously-given meaning. For example, a mixture of the cyanamide compound with the amine starting material, which is preferably used in the form of a salt thereof, particularly a mineral acid addition salt, e.g. hydrochloride, hydrobromide, sulfate and the like, is heated to form a melt, which is then dissolved in a solvent, such as a lower alkanoic acid, e.g. acetic acid, and the like; from the mixture the desired product is isolated. The reaction may also be performed in the presence of a suitable solvent, such as a lower alkanol, e.g. ethanol and the like. The salt used as the starting material may also be formed in situ by carrying out the reaction in the presence of an acid, particularly a concentrated aqueous mineral acid, e.g. hydrochloric acid and the like. The cyanamide reagent too may be formed in situ; for example, 1-nitroso-3-methyl-guanidine furnishes the N-methyl-cyanamide during the reaction, and the latter then reacts with the amine to form the desired guanidine compound. The reaction may proceed exothermically, and, if necessary, may be maintained by heating, for example, to from about 80° to about 200°; the atmosphere of an inert gas, e.g. nitrogen, may be advantageous.

A third modification of the general procedure for the manufacture of the compounds of this invention comprises reacting an amine starting material having the above-given formula with a salt of a 1-guanyl-pyrazole. A salt of a 1-guanyl-pyrazole is primarily a salt with a mineral acid, such as, for example, nitric acid; the pyrazole nucleus of such reagent may contain additional substituents, particularly lower alkyl, e.g. methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like; advantageously, contact with carbon dioxide should be avoided, for example, by performing the reaction in the atmosphere of an inert gas, e.g. nitrogen. The reaction mixture is preferably heated, for example, to the melting point of the mixture or to the boiling point of the solvent.

The compounds of this invention may also be prepared by converting in a compound of the formula

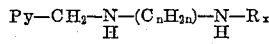

in which Py and the group of the formula —$(C_nH_{2n})$— have the above-given meaning, and $R_x$ represents a substituent capable of being converted into the amidino group of the formula

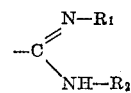

in which $R_1$ and $R_2$ have the previously-given meaning, or a salt thereof, the group $R_x$ into the amidino group of the above formula, and, if desired, carrying out the optional steps.

Depending on the character of the substituent $R_x$, its conversion into an amidino group may be carried out according to different modifications.

For example, the substituent $R_x$ may contain a carbon atom attached to the nitrogen of the amino group in the starting material; such carbon atom is connected to another nitrogen atom. Said carbon atom may carry an additional nitrogen atom, as well as other heteroatoms, such as, for example, oxygen or sulfur. The substituent $R_x$ may be represented, for example, by cyano of the formula —C≡N, carbamyl of the formula —CONH—$R_1$, in which $R_1$ has the above-given meaning, thiocarbamyl of the formula —CSNH—$R_1$, guanidino-(imino)methyl of the formula

in which $R_2$ has the previously-given meaning, and the like. Amino-compounds having such groups attached to the nitrogen atom, have the previously-mentioned characteristic, i.e. to the amino group is attached a carbon atom, which carries at least one nitrogen atom, apart from other nitrogen or heteroatoms. Most of these starting materials are converted into the desired guanidino derivatives by ammonolysis or aminolysis.

For example, a cyanamide may be converted into a guanidine derivative by treatment with ammonia, an ammonia-furnishing reagent or an amine. Such reaction may be carried out, for example, by treating the cyanamide compound with liquid ammonia or an amine, usually under pressure and at an elevated temperature, and, if necessary, in the presence of an anion capable of forming a stable salt with a resulting guanidine; ammonium acetate, ammonium sulfate, ammonium chloride and the like, may serve as anion sources. Ammonia may be replaced by ammonia-furnishing ammonium salts; such salts are, for example, ammonium monohydrogen phosphate, which may be used under pressure and at an elevated temperature, or ammonium nitrate. In the latter case, a salt, such as, for example, an alkaline earth metal or an alkali metal, e.g. calcium, sodium, potassium and the like, salt of the cyanamide starting material is preferably used, which may be reacted with the ammonium nitrate in the presence of catalytic amounts of water.

The starting materials may be prepared, for example, by treating an amine having the previously-given formula with about equimolar amounts of a cyanogen halide, e.g. cyanogen chloride, cyanogen bromide and the like, preferably in an inert solvent, such as, for example, diethylether and the like.

A carbamyl substituent representing $R_x$ in the above formula may be converted into the desired amidino group by treatment with ammonia or an amine, preferably, in the presence of a dehydrating agent, such as, for example, phosphorus pentoxide and the like. This reaction may be carried out at an elevated temperature and in a closed vessel; temperature and pressure may be reduced in the presence of a non-aqueous solvent and/or of a reaction accelerator, such as finely dispersed nickel, aluminum, aluminum oxide and the like. Furthermore, a thiocarbamyl group $R_x$ may be converted into an amidino group by treatment with ammonia or an amine, for example, in the presence of water and/or of a non-hydrolytic solvent, such as, for example, toluene and the like, and in the presence of a desulfurizing agent. The latter is selected advantageously from basic oxides, basic carbonates and the like, of heavy metals, such as lead, zinc, cadmium, tin, mercury and the like. Suitable desulfurizing compounds are, for example, lead oxide, mercuric oxide, lead hydrogen carbonate and the like; mercuric chloride may also be used. The ammonolysis or aminolysis procedure is preferably carried out at an elevated temperature, and, if necessary, in a closed vessel, primarily to avoid loss of ammonia or the amine.

Ureas and thioureas used as the starting material in the above-mentioned modification of the procedure or salts thereof may be obtained, for example, from an amine having the previously-given formula by treating the latter with an amomnium cyanate or thiocyanate or with a metal, such as alkali metal, e.g. sodium, potassium and the like, cyanate in or thiocyanate. These reagents are preferably used in the presence of a solvent, for example, water which, if necessary, contains a small amount of an acid, such as a mineral acid, e.g. hydrochloric, sulfuric acid and the like. The urea or thiourea starting materials may also be obtained by ammonolysis or aminolysis of reactive functional derivatives of N-substituted carbamic acids, as well as N-substituted thiocarbamic acids, in which the N-substituent has the formula Py-$CH_2$—NH—($C_nH_{2n}$)—, in which Py and the group of the formula —($C_nH_{2n}$)— have the previously-given meaning. Such reactive functional derivatives are primarily esters, for example, lower alkyl, e.g. methyl, ethyl and the like, esters of halides, e.g. chlorides and the like, of such acids. Upon ammonolysis or aminolysis, if necessary, at an elevated temperature in a closed vessel, these carbamic and thiocarbamic acids yield the desired urea or thiourea derivative, respectively.

A further group representing $R_x$ in the above starting materials is a biguanido group; biguanidine compounds, upon reaction with an ammonolysis or aminolysis reagent, may be converted into the desired guanidine compound. This reaction may be carried out by treating the starting material with ammonia, as well as with an ammonium salt, e.g. ammonium chloride, ammonium nitrate, ammonium sulfate and the like, whereby such salt may also promote ammonolysis with ammonia itself or with an amine.

The biguanidine compounds used as the starting materials in the above procedure may be prepared, for example, by reacting an N-substituted amine, in which the N-substituent has the formula Py-$CH_2$—NH—($C_nH_{2n}$)—, in which Py and the group of the formula —($C_nH_{2n}$)— have the previously-given meaning, with dicyano-diamide, preferably in the presence of a complex metal-forming salt, e.e. copper sulfate and the like. A resulting biguanido complex metal salt, such as the copper complex salt thereof, may be liberated to form the free compound by treatment with an acid, such as a mineral acid, e.g. sulfuric acid and the like, to yield the free compound.

Apart from amines of the above formula, in which the carbon atom of $R_x$ is substituted with another nitrogen atom, other N—$R_x$-amine starting materials may be useful in the conversion into the desired guanidine compounds. In such a conversion intermediates may be formed, which may have the previously-given characteristics, i.e. the carbon atom of the group $R_x$ carries a nitrogen atom. Suitable groups $R_x$ of that type are, for example, ester groups, formed by a carboxyl, a thionocarboxyl, a thiolocarboxyl or a dithiocarboxyl group with a lower alkanol, as well as halogeno-carbonyl or halogeno-thionocarbonyl groups, in which halogeno represents primarily chloro. Particularly useful starting materials are, for example, the reactive functional derivatives of N-substituted carbamic acids and N-substituted thiocarbamic acids, in which the N-substituent has the formula Py-$CH_2$—NH—($C_nH_{2n}$)—, in which Py and the group of the formula —($C_nH_{2n}$)— have the previously-given meaning, or salts thereof. As shown hereinabove, esters, for example, lower alkyl, e.g. methyl, ethyl and the like, esters, or halides, e.g. chlorides and the like, of such acids yield upon ammonolysis the corresponding urea and thiourea derivatives mentioned above. However, if, for example, the ammonolysis or aminolysis of a carbamic acid ester is carried out in the presence of a dehydrating agent, such as one of the reagents employed as previously described in the conversion of a urea derivative into a guanidine, an N-substituted-carbamic acid ester may be converted directly into the desired guanidine compound. Or, an ester of an N-substituted thiocarbamic acid may be subjected to ammonolysis or aminolysis to yield directly the desired guanidine compound, for example, in the presence of a desulfurizing reagent, such as one of those previously shown in the ammonolysis of a thiourea compound, e.g. lead oxide and the like.

The carbamic and thiocarbamic acid derivatives used as the starting materials may be prepared according to known methods. For example, upon treatment of an N-substituted amine of the previous formula with phosgene or thiophosgene, which reagents may be used in a slight excess over the amine, an N-substituted isocyanate and an N-substituted isothiocyanate, respectively, may be formed, in which the N-substituent has the formula Py-$CH_2$—NH—($C_nH_{2n}$)—, in which Py and the group of the formula —($C_nH_{2n}$)— have the previously-given meaning. The resulting cyanate or isothiocyanate compound may then be converted into an ester of the N-substituted carbamic or N-substituted thiocarbamic acid by treatment with an alcohol, for example, a lower alkanol, e.g., methanol, ethanol and the like, or into the corresponding thiolesters, by treatment with a mercaptan, such as a lower alkylmercaptan, e.g. methylmercaptan, ethylmercaptan and the like. The above derivatives may also be obtained by reacting an amine having the previously-given formula, with a carbonic acid lower alkyl ester, or, particularly a dithiocarbonic acid lower alkyl ester, as well as with a lower alkyl ester of a halogenoformic acid, such as chloroformic acid, or, primarily, of a halogeno-thioformic acid, such as chlorothioformic acid.

Or, a salt of an amine having the previously-shown formula, particularly a hydrohalide, e.g. hydrochloride, thereof, when reacted with the appropriate amount of phosgene of thiophosgene at an elevated temperature, preferably in a closed vessel, yields the desired N-substituted carbamic acid chloride and N-substituted thiocarbamic acid chloride, respectively.

A resulting salt may be converted into the free compound in the customary way, for example, by treatment with a strong alkaline reagent, such as aqueous alkali metal hydroxide, e.g. lithium sodium, potassium hydroxide and the like, a strong quaternary ammonium anion (hydroxyl ion) exchange preparation and the like.

A resulting salt may be converted into another salt according to known methods. For example a "hydrochloride half-sulfate" may be formed by reacting the "half-sulfate" with hydrogen chloride. Furthermore, a resulting salt may be treated with a suitable anion exchange preparation, as well as with an alkali metal or silver salt of an acid in a suitable solvent, and another salt may be formed.

A free compound may be transformed into an acid addition salt by reacting it, preferably a solution thereof in and inert solvent or solvent mixture, with an appropriate inorganic or organic acid or a solution thereof, or with an anion exchange preparation, and isolating the salt. Semi-, mono- or poly-salts may be formed, as well as mixed salts.

The invention also comprises any modification of the general process, wherein a compound obtainable as an intermediate at any stage of the process is used as the starting material and the remaining step(s) of the process is (are) carried out; also included within the scope of the invention are any new intermediates.

In the process of this invention such starting materials are preferably used which lead to final products mentioned

Example 1

A mixture of 5.0 g. of N-(4-picolyl)-ethylene diamine and 4.6 g. of S-methyl-isothiourea sulfate in water is refluxed for four hours. The solution is concentrated under reduced pressure; the residual oil crystallizes on cooling to yield the N-(2-guanidinoethyl) - N - (4-picolyl)-amine sulfate of the formula

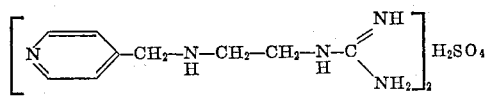

which after recrystallization from isobutanol and diethyl ether, contains about one mole of water of crystallization and melts at 68–70°.

Example 2

A mixture of 15.0 of N-(4-picolyl)-ethylene diamine and 13.8 g. of S-methyl-isothiourea sulfate in 25 ml. of water is allowed to stand at room temperature for three days; during that period, evolution of methylmercaptan occurs without heating. After completion of the reaction, the water is allowed to evaporate to about one-half of the original volume by standing at room temperature. The first crop of solid material (yield: 10.0 g.) is filtered off and washed with acetone; a sample is dried at 40° under reduced pressure for three days to yield the anhydrous N-(2-guanidinoethyl)-N-(4-picolyl)-amine sulfate, M.P. 149–151°. A second crop (yield: 13.0 g.) is obtained by evaporating the reaction mixture to dryness and washing the residue with acetone; the solid material represents the N-(2-guanidinoethyl)-N-(4-picolyl)-amine sulfate monohydrate and melts at 85–90°.

Other compounds which may be prepared according to the above procedure by selecting the appropriate starting materials are, for example, N-(2-guanidinoethyl)-N-(2-picolyl) - amine, N - (3-guanidinopropyl)-N-(4-picolyl)-amine, N - [2 - (2,3 - dimethylguanidino) - ethyl]-N-(3-picolyl)-amine, N - (2 - guanidino - 2 - methylethyl)-N-(2-methyl-4-picolyl)-amine and the like, particularly the acid addition salts thereof.

What is claimed is:

1. A member selected from the group consisting of a guanidine compound of the formula

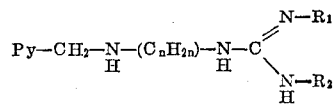

in which Py is a member selected from the group consisting of pyridyl and (lower alkyl)-pyridyl, the group of the formula $—(C_nH_{2n})—$ is lower alkylene separating the two nitrogen atoms by at least two carbon atoms, and each of the groups $R_1$ and $R_2$ stands for a member selected from the group consisting of hydrogen and lower alkyl, and an acid addition salt thereof.

2. A compound of the formula

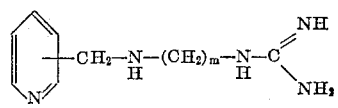

in which the letter $m$ stands for one of the integers 2 and 3.

3. An acid addition salt of a compound of the formula

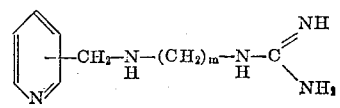

in which the letter $m$ stands for one of the integers 2 and 3.

4. N-(2-guanidinoethyl)-N-(4-picolyl)-amine.
5. An acid addition salt of N-(2-guanidinoethyl)-N-(4-picolyl)-amine.
6. N-(2-guanidinoethyl)-N-(4-picolyl)-amine sulfate.
7. N-(2-guanidinoethyl)-N-(4-picolyl)-amine sulfate monohydrate.

References Cited in the file of this patent
UNITED STATES PATENTS 3,036,083    Mull _____ May 22, 1962